(12) United States Patent
Skinner et al.

(10) Patent No.: US 6,560,878 B2
(45) Date of Patent: May 13, 2003

(54) MULTI-COMPONENT, EXTRUDED VEGETATION CUTTING LINE

(75) Inventors: David B. Skinner, Columbia, SC (US); Jack D. Davies, Lexington, SC (US); Chad Boyd, Lexington, SC (US)

(73) Assignee: Shakespeare Company, LLC, Columbia, SC (US)

( * ) Notice: Subject to any disclaimer, the term of this patent is extended or adjusted under 35 U.S.C. 154(b) by 27 days.

(21) Appl. No.: 09/834,221

(22) Filed: Apr. 12, 2001

(65) Prior Publication Data

US 2002/0023356 A1 Feb. 28, 2002

Related U.S. Application Data

(60) Provisional application No. 60/196,413, filed on Apr. 12, 2000.

(51) Int. Cl.[7] ............................................. A01D 34/416
(52) U.S. Cl. ......................... 30/347; 30/276; 428/378
(58) Field of Search .................. 30/276, 347; 428/370, 428/373, 375, 377, 379, 395, 397, 398, 399, 378, 396; D8/8

(56) References Cited

U.S. PATENT DOCUMENTS

| | | | | |
|---|---|---|---|---|
| 4,054,993 A | * | 10/1977 | Kamp et al. .................. | 30/276 |
| 5,430,943 A | | 7/1995 | Lee .............................. | 30/347 |
| 5,524,350 A | * | 6/1996 | Boland ......................... | 30/347 |
| 5,840,425 A | | 11/1998 | Hodan ......................... | 428/372 |
| 6,061,914 A | | 5/2000 | Legrand ....................... | 30/347 |
| 6,171,697 B1 | * | 1/2001 | Legrand ....................... | 428/372 |
| 6,191,072 B1 | * | 2/2001 | Duffy .......................... | 504/360 |

FOREIGN PATENT DOCUMENTS

| | | |
|---|---|---|
| EP | 0 867 108 A1 | 9/1998 |
| EP | 0 893 048 A1 | 1/1999 |

* cited by examiner

*Primary Examiner*—Hwei-Siu Payer
(74) *Attorney, Agent, or Firm*—Renner Kenner Greive Bobak Taylor & Weber

(57) ABSTRACT

A multicomponent monofilament cutting line includes a first component material and a second component material, the same or different in chemical structure from the first component material and extruded separately from the first component material. The second component material provides the cutting line with cutting edges and has increased wear resistance properties and increased abrasion resistance properties compared to those same properties of the first component material. The monofilament cutting line for a rotary trimmer for cutting vegetation preferably includes a first component material having a specific gravity of about 1.15 g/cc or less; and a second component material having a specific gravity greater than 1.15 g/cc. Notably, the multi-component, monofilament cutting line itself has increased wear resistance and increased abrasion resistance as compared to a single component monofilament cutting line employing one of either the first or second component materials.

28 Claims, 3 Drawing Sheets

MULTI-COMPONENT, EXTRUDED VEGETATION CUTTING LINE

This application claims the benefit of pending U.S. provisional application No. 60/196,413 filed Apr. 12, 2000.

TECHNICAL FIELD

This invention relates generally to a bicomponent or multi-component extruded monofilament used as a vegetation cutting line for a rotating trimmer. More particularly, the invention relates to an extruded monofilament cutting line having wear resistant edges, and, in a particular embodiment, replenishing wear-resistant edges imbedded within an abrasion or non-abrasion resistant sheath. The present invention also relates to an extruded monofilament cutting line containing an embedded grit or abrasive material. The present invention further relates to an extruded monofilament cutting line containing a high density material to increase the force of the impact between the cutting line and the vegetation.

BACKGROUND OF THE INVENTION

Vegetation cutting devices are well known in the art. These devices, including rotating trimmers, typically employ monofilament cutting or trimming line for cutting overgrown vegetation such as grass and weeds, edging lawns around borders and concrete, and trimming grass in places that are hard to reach with lawn mowers. Smaller lines are typically used for trimming grasses, while fine blades and larger lines are typically used for cutting larger stalks of weeds or grasses and heavy growth.

Shaped monofilament cutting lines were introduced in the late 1980's and have been shown to have significantly improved the cutting quality of weeds and like vegetation. By the term "shaped", it is meant that the cutting line has a cross-sectional configuration other than round, which is the cross-sectional configuration of conventional monofilament cutting lines. More particularly, cross-sectional shapes other than round have been used because the edges or corners created by those shapes provide for cleaner cuts of the grass or weeds, resulting in less tearing of the blades of grass. In turn, less tearing of the blades of grass desirably results in less browning of the grass ends after cutting.

There are, however, at least two drawbacks to using these shaped monofilament lines. First, some of the shapes tend to damage the head of the rotating trimmer when it comes out of the head, since the outermost surface of the line is not smooth. Vice versa, the head may damage the trimmer line. Second, the shapes have been known to become worn during use, thereby reducing their improved effectiveness in the cut quality of the vegetation. That is, some of the edges and corners created by the cross-sectional shapes of the cutting line wear off, leaving a somewhat rounded strand that is less effective in cutting vegetation.

Various attempts have been made heretofore to overcome this problem. For example, U.S. Pat. No. 5,430,943 provides a shape-within-a-shape monofilament line. The patent proposes the use of a cutting element having a shaped inner cutting edge that is exposed for use after the outermost cutting edge has been worn away. However, this concept has proved to be limited by the number of shapes that can be designed, and it only uses a single component material in the construction of the monofilament cutting line.

Others have attempted to provide mono-component cutting lines with improved wear resistant properties. Ideally, blended resins and additives extruded to produce the cutting lines are selected to maximize the wear resistance and the impact properties of the monofilament cutting line. Unfortunately, it has been found that materials that provide the best results with respect to wear resistance do not generally provide the best results with respect to impact properties. Thus, a compromise is generally made to balance the performance of the monofilament cutting line. Additionally, it has been found that resins that provide the best wear resistance also have properties which cause defects such as voids, excessive out-of-roundness, or splitting, of the monofilament during extrusion.

Thus, the need exists for a monofilament cutting line exhibiting improved wear resistance as compared to other monofilament cutting lines while maintaining good impact properties, and, if desired, that is capable of protecting the head of the rotating trimmer.

SUMMARY OF INVENTION

It is therefore, an object of the present invention to provide a multi-component, extruded monofilament cutting line.

It is another object of the present invention to provide a multi-component monofilament cutting line having improved wear resistance and good impact properties.

It is still another object of the present invention to provide a multi-component monofilament cutting line that will neither damage nor be damaged by the head of the rotating trimmer in which it may be employed.

It is yet another object of the present invention to provide a multi-component monofilament cutting line having a smooth fiber surface when coming out of the trimmer head.

It is still another object of the present invention to provide a shaped multi-component monofilament cutting line that will maintain its cross-sectional configuration for a longer period of use.

It is yet another object of the present invention to provide a multi-component monofilament cutting line which can offer improved wear resistance without excessive voids, splitting or out-of-roundness.

It is a further object of the present invention to provide a multi-component monofilament cutting line with replenishing edges.

It is still a further object of the present invention to provide a multi-component monofilament cutting line having inner edges and outer edges, wherein the inner edges may be exposed after the outer edges have been worn down.

It is yet a further object of the present invention is to provide a multi-component monofilament cutting line containing an embedded grit or abrasive material.

It is yet an additional object of the present invention to provide a multi-component monofilament cutting line containing a high density material to increase, during use, the force of impact between the cutting line and vegetation.

At least one or more of the foregoing objects, together with the advantages thereof over the known art relating to monofilament cutting lines, which shall become apparent from the specification that follows, are accomplished by the invention as hereinafter described and claimed.

In general, aspects of the present invention are accomplished by providing an extruded monofilament cutting line for a rotary trimmer for cutting vegetation including a first component material; and a second component material, the same or different in chemical structure from the first component material and extruded separately from the first component material. The second component material provides the cutting line with cutting edges and has increased wear resistance properties and increased abrasion resistance properties compared to those same properties of the first component material.

Other aspects of the invention are provided by a monofilament cutting line for a rotary trimmer for cutting vegetation comprising a first component material having a specific gravity of about 1.15 g/cc or less; and a second component material having a specific gravity greater than 1.15 g/cc.

Still other aspects of the present invention are accomplished by providing a multi-component, monofilament cutting line for a rotary trimmer for cutting vegetation including at least a first component material; and at least a second component material, the same or different in chemical structure from the first component material but not blended with the first component material and extruded separately from the first component material. The second component material provides the cutting line with cutting edges. Notably, the multi-component, monofilament cutting line has increased wear resistance and increased abrasion resistance as compared to a single component monofilament cutting line employing one of either the first or second component materials.

Still other aspects of the present invention are accomplished by providing a monofilament cutting line including a first component material having an abrasive filler and/or a second component material providing a sheath surrounding the first component material.

Exemplary multi-component monofilament cutting lines incorporating the concepts of the present invention are shown by way of example in the accompanying drawings without attempting to show all the various forms and modifications in which the invention might be embodied, the invention being measured by the appended claims and not by the details of the specification.

DETAILED DESCRIPTION OF THE INVENTION

As noted hereinabove, the present invention is directed toward the production of a multi-component, monofilament cutting line for use in rotary grass trimming machines. The production of monofilament cutting line according to the present invention involves the use of bicomponent or multi-component extrusion technology. That is, in the production of the monofilament, two or more separate resins may be extruded separately (using separate extruders) into and through an intricately designed die head of the extrusion machine to which each extruder is operatively connected, to form a single monofilament of two or more separate components.

Typically, the monofilament will be layered, having a core-sheath or core-mantle(s)-sheath configuration, although the present invention is not necessarily limited thereto. The core-sheath or core-mantle(s)-sheath construction of the monofilament can be symmetrical, i.e., layered, or asymmetrical, e.g., as a bivalve or multivalve arrangement. Other arrangements of two or more components are also contemplated and are not necessarily limited by this disclosure. For example, side-by-side configurations, islands-in-the-stream configurations, and multi-legged configurations are also believed suitable. For ease of discussion, however, the core-mantle-sheath configuration will be generally discussed.

The monofilament itself can be solid or hollow, and may have a round or another shaped cross-sectional configuration. The core, mantle(s) or sheath each may also have any cross-sectional configuration known in the art unless expressly provided otherwise. Moreover, each of the core, the mantle, or the sheath may include a filled or unfilled polymer, which may be commonly or not commonly used in the manufacture of monofilament cutting line, depending upon the structure and properties desired of the monofilament and each of its components. It will also be understood that, where a bicomponent extrusion technique is employed, there will be no mantle(s).

Figure 1:
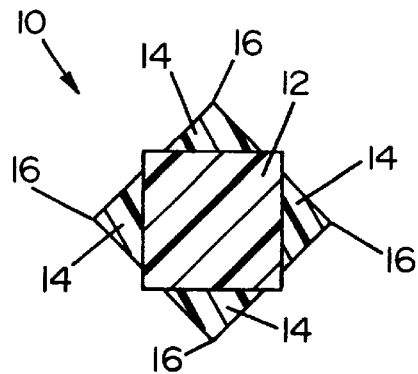
FIG. 1 is a representative cross-sectional view of one embodiment of the multi-component monofilament cutting line of the present invention.

In a first embodiment shown in FIG. 1, the cross-sectional configuration of a multi-component monofilament cutting line, generally denoted by the numeral 10, is presented. The cutting line 10 includes a first component material 12 and a second component material 14 providing cutting edges 16. For apparent reasons, in the embodiment of FIG. 1, first component material 12 may be considered the core of the cutting line 10, while second component material 14 may be considered the sheath. Preferably, first component material 12 is a tough, impact resistant material, and second component material 14 is a material having substantial wear and abrasion resistant properties so as to provide cutting line 10 with hard, wear resistant cutting edges 16.

It will be appreciated that while, in this embodiment, second component material 14 may be referred to as a "sheath," there is no requirement that the second component material 14 completely encompass or surround the first component material 12, providing a "core". Cutting edges 16 may be separately spaced around first component material 12, such as shown in FIG. 1, and extend along the length of the monofilament, with first component material 12 extending between the various cutting edges 16 with respect to the outside surface of the monofilament cutting line 10. Thus, monofilament cutting line 10 may be considered "striped" with wear resistant, second component material 14 extending along the longitudinal axis proximate cutting edges 16 of the monofilament 10. Still further, the second component may be limited and used only as the cutting edges themselves, the rest of the cutting line being made from the first component material or other materials.

Notably, monofilament cutting line according to the present embodiment may have any cross-sectional configuration known in the art as providing suitable cutting edges for cutting grasses and other overgrown vegetation. A number of alternative shaped monofilament designs are shown in U.S. Pat. Nos. 5,430,943; 4,869,055, D379,419, D379,052, D376,739, D376,516, D376,079, D376,078, D365,734, D364,079, D358,535, and D349,634, all of which are incorporated herein by reference. Generally, any cross-sectional shape other than round may be employed for this embodiment of the present invention although, preferably, distinct cutting edges are provided. Moreover, as discussed above, the second component material can form a sheath surrounding the first component material or only form that part of the cutting line forming the cutting edges.

As mentioned above, multi-component cutting line 10 includes a core first component material 12 comprising essentially any resin material with good impact properties and reasonably good wear resistant properties. This material is preferably tough and may include, but is not necessarily limited to, polyolefins, POLYAMIDES, polyurethanes, and copolymers, terpolymers, and ionomers thereof, as well as mixtures or blends thereof. Preferred first component materials 12 suitable as a core include nylon 6 and nylon copolymers and terpolymers, including any one or more of nylon 6/66, 6/69, 6/636, 6/11, 6/12, 6/612 and 6/610. Polymers commonly used in the manufacture of cutting lines are particularly useful for the core first component material 12 in this embodiment.

First component material 12 may be filled or unfilled, and, for purposes of the present embodiment, the term "component material" is to be understood as broadly covering both filled and unfilled materials. If filled, first component material 12 may be a blend of polymer and filler and include any known filler suitable for use in the material being filled. For example, fillers may include mineral fillers and salts such as, but not limited to, silica, mica, carbon black, talc or aluminum powder. These fillers are generally added to decrease cost.

Other fillers may include high molecular weight fillers that increase the density of the core as explained hereinbelow. Essentially, these fillers increase the mass of the cutting line, thereby imparting greater impact to the cutting line as compared to single component monofilament lines.

Similarly, fillers such as clay may be added to impart other physical characteristics to the component material. Clay generally imparts toughness to the material.

Still other fillers may be added for different reasons. For example, first component material 12 may include cross-linking additives such as functionalized epoxy resins and the like to chemically link first component material 12 to second component material 14.

Second component material 14 constitutes the cutting edges 16 of monofilament cutting line 10. Generally, the material selected for second component material 14 should be extrudable, yet impart better wear resistance and better abrasion resistance than the polymers commonly used in rotary trimmer lines. Essentially any known, high abrasion resistant, high wear resistant material may be used. By providing a material that provides greater wear resistance and greater abrasion resistance, the overall performance and durability of the cutting line in cutting blades of grass or other vegetation is improved. That is, use of a second component material having increased wear resistance and increased abrasion resistance as compared to the first component material, improves the wear resistance and abrasion resistance of the multi-component, monofilament cutting line as compared to other known single component monofilament cutting lines as well.

It is generally preferred that the polymer(s) employed in the production of second component material 14 be comparable or compatible with the polymer(s) employed in first component material 12. Thus, the second component material 14 may be the same or different in chemical structure as the first component material 12. However, second component material 14, providing cutting edges 16 to monofilament cutting line 10, should have better wear and abrasion resistant properties as compared to first component material 12. Thus, second component material 14 and, thus, cutting edges 16, may comprise the same or different type of material as first component material 12, and may also be filled or otherwise modified with one or more additives, as above. To obtain improved wear and abrasion resistance properties when the same material components are used, one of the component materials must be processed differently or processed through the extruder differently. This may be done with a different extrusion head, or using different draw ratios, or any other means known in the art.

It will also be appreciated that the second component material 14 can be made from plastics such as, but not limited to, polycarbonate, ionomer resins such as Surlyn®, and polyphenylene sulfide (PPS), or can be made from more conventional polymers with various fillers or additives to provide improved wear and abrasion resistant properties. Suitable examples of such abrasion-resistant and/or wear-resistant additives include any of the plastics contemplated above, metal, metallic materials, ceramic materials, glass fibers including chopped fibers, fine denier chopped thermoplastic fibers, cross-linkers, amorphous resins or any other material that can be suitably extruded with or without conventional polymers and provide improved abrasion or wear resistance.

Typical levels of abrasion resistance or wear resistance differ significantly depending upon the material used, and the cross-sectional configuration of the cutting line itself. Thus, determining quantitative levels for these properties for prior art cutting lines is insignificant unless or until compared to counterpart multi-component monofilament cutting lines of the present invention. However, it is desirable that the novel multi-component monofilament cutting lines of the present invention provide greater wear resistance and abrasion resistance than the prior art single component monofilament cutting lines.

To improve upon the prior art, the present embodiment of a multi-component cutting line according to the present invention employs more than one component material, and particularly employs, at the cutting edges of the cutting line, a component material having better wear and abrasion resistant properties than component material employed in areas that are not proximate the cutting edges of the cutting line.

For example, in FIG. 1, as has already been mentioned, second component material 14 may have better wear and abrasion resistant properties than first component material 12, so as to provide a cutting line 10 with increased structural integrity at those areas where it is most needed, mainly, proximate the intended cutting edges of the cutting line. On the other hand, the impact strength of the second component material 14 may or may not be that of the first component material.

Moreover, due to considerations of material costs or other practical design considerations, the component material providing the cutting line with cutting edges, such as second component material 14 of FIG. 1, may optionally be provided only at areas proximate the cutting edges. In other words, if higher cost is an important consideration, extruding the second component material 14 (in this embodiment, deemed the more expensive material) so as to only just cover cutting edges 16 at the tips thereof may be appropriate.

It will be appreciated that other problems, including those associated with the use of certain wear resistant materials, such as voids, splitting and out-of-roundness, can now be more easily avoided. For example, any voids existent in second component material 14, as a result of employing certain wear resistant materials, can be readily filled with first component material 12 during extrusion, and vice versa. The problems with splitting and out-of roundness are also essentially eliminated due to the fact that smaller diameter and differently shaped components are being utilized for extrusion into multi-component monofilament cutting line 10.

It will also be appreciated that the extruded multi-component monofilament cutting line 10 produced according to the present invention should be flexible enough to be used as vegetation cutting line. While some materials chosen for second component material 14 may be particularly hard and wear resistant, they should have some flexibility or monofilament cutting line 10 must provide a sufficient amount of flexible first component material 12 to compensate for the lack of flexibility of second component material 14. Moreover, it has been found that some polymeric materials, while having increased resistance to wear and abrasion, do not impart great impact strength. If such a material is used, it may be desirable to employ a first component material 12 having improved impact strength as compared to that of the prior art or the second component material 14.

In practice of the present invention, delamination of the second component material 14 from first component material 12 could be a concern. Adhesion between the component materials 12, 14 can be improved by mechanical interlocking or by improving the chemical interaction between them. Mechanical interlocking can be conducted at the die head of the extrusion process wherein first and second component materials 12, 14 can be separately extruded in such a manner that, upon forming monofilament cutting line 10, the component materials 12, 14 are mechanically locked to one another. For example, second component material 14 may be extruded to include a triangular flange extending toward first component material 12, while first component material 12 is extruded to include a complementary triangular recess for receiving the flange. Of course, it will be understood that many other techniques could be used to mechanically interlock the components.

Bonding of first and second component materials 12, 14, via chemical interaction, can be achieved through a number of alternative methods. For example, coupling agents may be incorporated into the composition of both of the extruded component materials 12, 14. Alternatively, adhesive-type additives, such as polyamide terpolymers or dimer acid-based POLYIMIDES, could be added to one or both of the component materials 12, 14. Still further, additives having ionic functionalities, e.g., nylon ionomers, could be added to either or both component materials 12, 14. Each of these methods are believed to be known in the art, and any other method suitable for bonding the component materials 12, 14 together without affecting the desired physical properties of the resultant monofilament cutting line 10 would be suitable.

Thus, it should be evident that multi-component monofilament cutting line 10 of the present invention is highly effective in providing both good impact properties, as provided by first component material 12, and excellent wear and abrasion resistance properties, as provided by second component material 14. Problems with voids, splitting and excessive out-of-roundness are also avoided.

It is to be understood that additional layers of material, preferably with differing levels of wear and abrasion resistance as well as impact properties, may be employed between the "core" of first component material 12 and "sheath" of second component material 14. These additional component materials can be extruded via a different extruder but through the same die head as the first and second component materials 12, 14. Furthermore, the additional component material(s) could also provide cutting edges such that a cutting edge "striped" along the longitudinal axis of the "core" of first component material 12 may be different from that of another cutting edge material "striped " along the same longitudinal axis of first component material 12. When an additional component material is employed, it is possible that it may be considered a "mantel" layer if it is substantially placed between a core layer and a sheath layer of component material, such as component materials 12 and 14. This concept of a mantel layer should be readily conceivable to those of ordinary skill in the art, and it is disclosed more fully hereinbelow with respect to other embodiments of the present invention.

In a second embodiment, it is envisioned that a multi-component monofilament cutting line with renewable cutting edges could be designed. This embodiment of a monofilament cutting line is exemplified in FIG. 2, and is designated generally by the numeral 20. Monofilament cutting line 20 includes first component material 22 and second component material 24, both of which may be comprised of materials as described hereinabove with respect to first component material 12 and second component material 14, respectively. Thus, second component material 24, providing edges 26, 27, and 28, describe more fully below, has better wear and abrasion resistant properties than first component material 22, and such wear and abrasion resistant properties preferably provide for a cutting line that also has improved wear and abrasion resistance properties which are superior to those of a single component cutting line.

Figure 2:
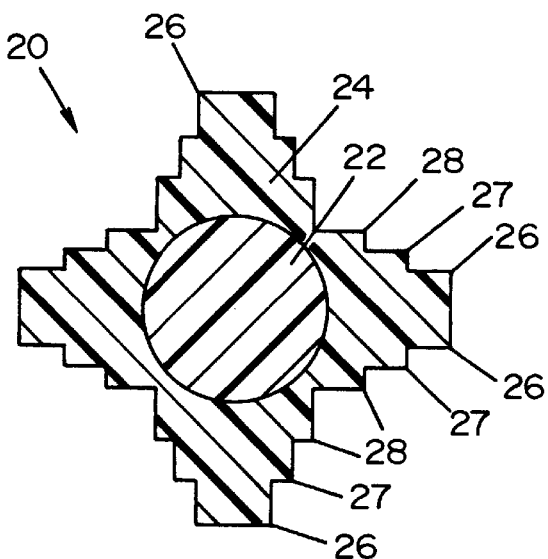
FIG. 2 is a representative cross-sectional view of another embodiment of the multi-component monofilament cutting line of the present invention.

The main distinction between the embodiment of FIG. 2 and that in FIG. 1 concerns the provision of exterior cutting edges 26, first recessed edges 27, and second recessed edges 28 within the shape of second component material 24.

As with second component material 14 in FIG. 1, second component material 24 is a hard, wear resistant material, serving to prolong the life of monofilament cutting line 20. The embodiment of FIG. 2 provides the added benefit of having renewable cutting edges. Particularly, as exterior cutting edges 26 become worn, first recessed edge 27 is more fully exposed and functionally replaces exterior cutting edge 26. Likewise, when first recessed edge 27 becomes worn, second recessed edge 28 is more fully exposed and functionally replaces first recessed edge 27. The embodiment for FIG. 2 is understood as having "renewable" cutting edges.

The "stepped" shape of second component material 24 is not the only shape that will provide a monofilament cutting line with renewable cutting edges. Rather, various shapes providing renewable cutting edges will be readily apparent, and the present invention is not to be limited to or by any particular renewable cutting edge design. Notably, U.S. Pat. No. 5,430,943 discloses a number of cutting line designs that would provide renewable cutting edges, and relevant portions of that patent, relating to renewable cutting edges, are incorporated herein by reference. The main difference between that patent and the present invention is the fact that the present invention conceives of the use of a multicomponent design, whereas the patent does not.

Continuing, as aforementioned, shaped monofilament cutting lines tend to damage the head of a rotating trimmer because the outer most surface of the cutting line is not smooth. The opposite may also be true, namely, that the head of the rotating trimmer may damage the cutting line. Providing cutting edges of increased wear and abrasion resistant material may serve to magnify this problem. Thus, it may be desirable to provide the wear and abrasion resistant cutting edges in an mantel layer that is surrounded by a sheath that serves to protect the cutting line and trimmer head from damaging one another.

Figure 3:
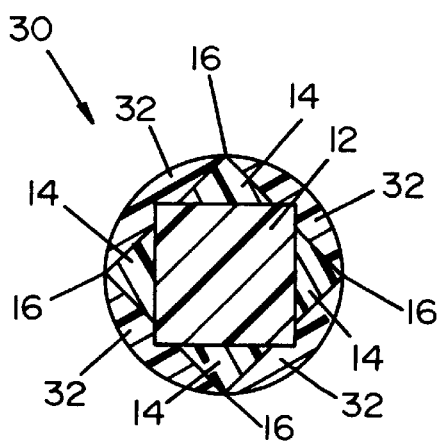
FIG. 3 is a representative cross-sectional view of a third embodiment of the multi-component monofilament cutting line of the present invention.

For example, in a third embodiment, as shown in FIG. 3, the concept, of a multi-component monofilament cutting line having a tough, impact resistant core provided by a first component material and hard, wear resistant cutting edges provided by a second component material is maintained and, thus, like parts as in FIG. 1 receive like numerals. In this embodiment however, the monofilament, denoted generally by the numeral 30, includes a third component material 32 that surrounds and embeds the second component material 14 and the first component material 12. Third component material 32 acts as a buffer between the cutting edges 16 of the monofilament 30 and the head of the rotary trimmer in which it is used, such that the opening on the head of the rotary trimmer does not become worn or abraded from the constant release of cutting line 30 therefrom.

In a preferred embodiment, third component material 32 is sufficiently brittle and/or non-abrasion resistant that, upon use of cutting line 30 to cut vegetation, the outer sheath of third component material 32 quickly degrades or breaks away, leaving the hard second component material 14 and its cutting edges 16 (now considered the "mantle" in FIG. 3) for cutting the grasses. In this embodiment, third component material 32 is preferably prepared from an abrasion or non-abrasion resistant material, which may be softer than the other components and may degrade quicker than the other components. For example, third component material 32 may be prepared from a low molecular weight nylon or other polymer such as a low molecular weight polyolefin, e.g., polypropylene. Third component material 32 may have a round or shaped outer cross-sectional configuration, the important consideration being that the smoothness of third component material 32 prevents wear on the opening of the head of the rotary trimming machine. Notably, this smooth sheath concept can be practiced within any embodiment of the present invention. For example, a smooth sheath could be provided around second component material 24 of the recessed edges embodiment shown in FIG. 2.

In yet another embodiment, the core-sheath concept (when there are two component materials) or core-mantle-sheath concept (when there are at least three component materials) is maintained, but this time the layers of the extruded monofilament from sheath to core are preferably prepared with progressively harder, i.e., more wear resistant, materials. That is, the outermost sheath (e.g., third component material 32 of FIG. 3 or second component material 14 of FIG. 1) is preferably extruded from polymers or other known materials commonly used in the manufacture of monofilament cutting line, while the core (e.g., first component material 12 of FIGS. 1 or 3) and/or mantle(s) (e.g., second component material 14 of FIG. 3), if any, are preferably extruded from harder, more wear resistant materials, including those materials described hereinabove with respect to second component material 14 or 24 in the embodiments of FIGS. 1–3. This would allow the edges of the harder, embedded shaped layers to be exposed as the layer above it is worn away. The result is a cutting line that continually presents sharp edges for cleanly cutting grasses and other vegetation.

Figure 4:
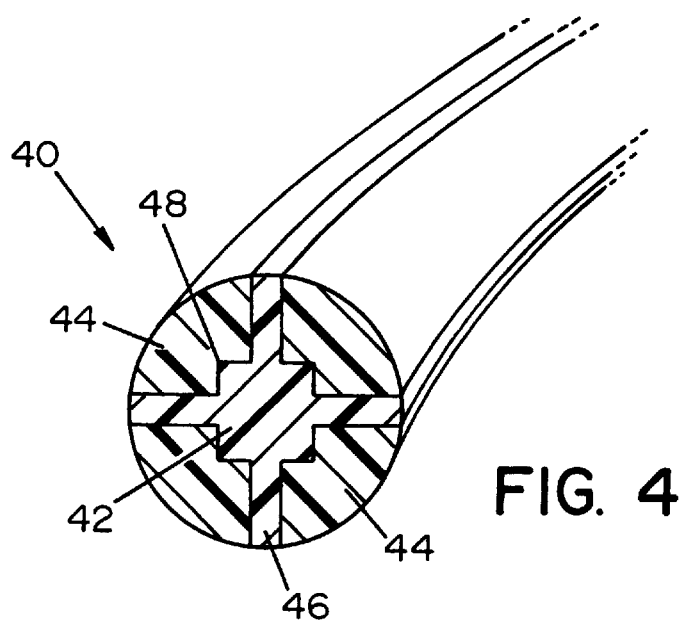
FIG. 4 is a representative perspective view of a fourth embodiment of the multi-component monofilament cutting line of the present invention, further showing a cross-section of the cutting line.

A core-sheath embodiment is depicted in FIG. 4, wherein the monofilament cutting line is designated generally by the numeral 40. Cutting line 40 includes a first component material 42, which is uniquely shaped and provides the core of cutting line 40. Second component material 44 surrounds first component material 42, thereby providing a sheath to cutting line 40. As mentioned hereinabove, in this embodiment of the present invention, the layers of cutting line 40 from sheath (i.e. second component material 44) to core (i.e. first component material 42) are prepared from progressively harder and more wear resistant materials. Notably, cutting line 40 of FIG. 4 also serves to convey the understanding that the present invention is not to be limited to a particular cross-sectional shape of any individual component within a multi-component monofilament cutting line, inasmuch as first component material 42, which is a core in the present embodiment, has a very unique shape, and provides useful exterior cutting edges 46 as well as recessed cutting edges 48.

Figure 5:
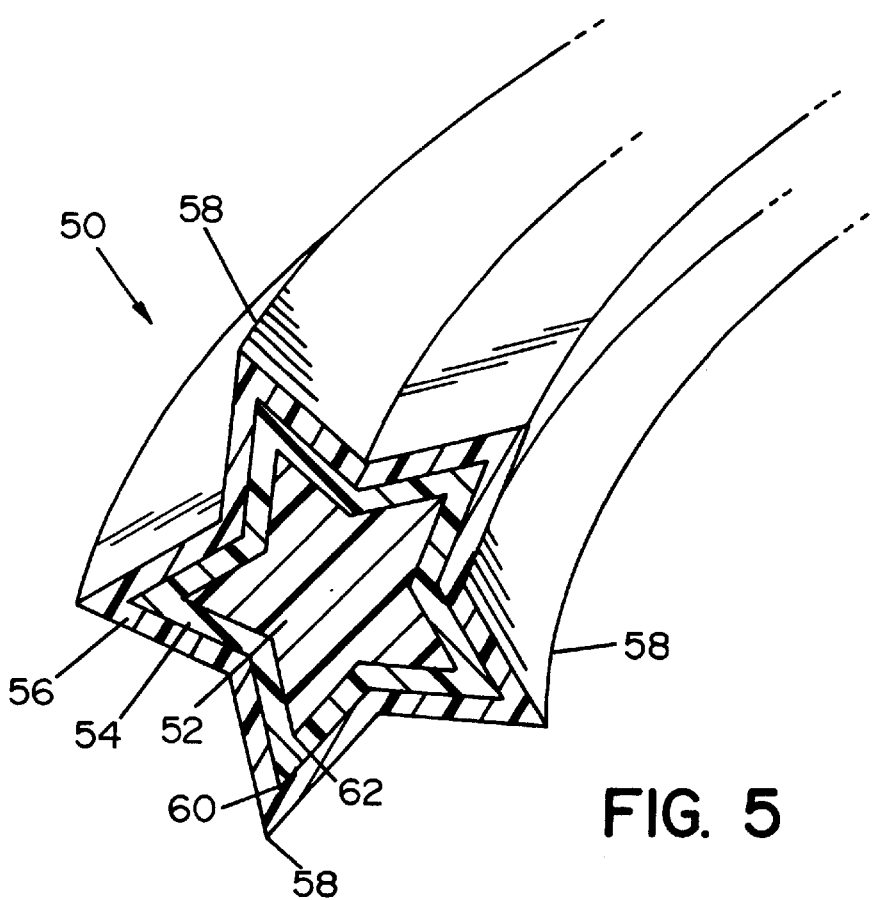
FIG. 5 is a representative perspective view of a fifth embodiment of the multi-component monofilament cutting line of the present invention, further showing a cross-section of the cutting line.

Referring now to FIG. 5, a core-mantel-sheath embodiment according to the above disclosure is depicted. Therein, multi-component monofilament cutting line 50 is shown having first, second, and third component materials 52, 54, and 56, respectively. The outer most sheath (i.e. third component material 56) is preferably extruded from polymers or other known materials commonly used in the manufacture of cutting lines while the mantel (i.e. second component material 52) is extruded from a harder, more wear resistant material, and the core (i.e. first component material 52) is extruded from material that is even harder and more wear resistant than second component material 54. Thus, as cutting edges 58, are worn away, the embedded cutting edges 60 are exposed, and, likewise, as embedded cutting edges 60 are worn away, cutting edges 62, are exposed. It should be readily appreciated, therefore, that cutting line 50 continually presents sharp edges for cleanly cutting grasses and other vegetation.

To improve upon the prior art, the present embodiment of a multi-component cutting line according to the present invention employs more than one component material, and particularly employs, at the cutting edges of the cutting line, a component material having increased wear and abrasion resistant properties than component material employed in areas that are not proximate the cutting edges of the cutting line. For example, in FIG. 1, as has already been mentioned, second component material 14 has better wear and abrasion resistant properties than first component material 12, so as to provide a cutting line 10 with increased structural integrity at those areas where it is most needed, mainly, approximate the intended cutting edges of the cutting line. Thus, the component material that provide the cutting edges to the cutting line aid in providing a cutting line which is superior in wear and abrasion resistance properties to conventional single component, monofilament cutting line. The first component layer provides needed impact strength similar to many component materials of prior art. Notably, due to considerations of material costs or other practical design considerations, the component material providing the cutting line with cutting edges, such as second component material 14 of FIG. 1, may optionally be provided only at areas proximate the cutting edges.

Although the embodiments hereinabove described are taught as containing either first and second component materials or first, second, and third component materials, it should be readily appreciated that multi-component monofilament cutting lines in accordance with the present invention may be provided with more than three component materials (i.e. a fourth component material, a fifth component material, etc.).

Concerns regarding delamination between the various component materials, as discussed hereinabove may also be addressed using the same mechanical or chemical methods suggested. Thus, adjacent component materials within a cutting line may be mechanically interlocked, i.e., by employing special extrusion techniques utilizing recesses and flanges, and/or may be chemically bound to one another, i.e., by incorporating coupling agents, adhesive-type additives, or ionic functionalities into the component material.

In yet another embodiment of the present invention, the shaped cutting line concept need not be applied to provide an improved cutting line. Rather, this embodiment focuses on the provision of a high density component material within a multi-component cutting line. However, as will be readily apparent from description hereinbelow, shaped cutting line may also advantageously employ high density component materials according to this present embodiment.

The high density component material may be distributed throughout the core component material and may include, generally, any material having a higher specific gravity than the base material being used for use in a cutting line. Without wishing to be limited to any particular material, the high density component material will typically be a high density polymer or a polymer including fillers so as to increase the specific gravity of the component material. Useful common non-limiting examples of high density polymers suitable for use in accordance with this concept of the present invention include various high molecular weight nylon terpolymers. Useful non-limiting examples of filler suitable that may be incorporated into polymers, whether of high density or not, so as to increase the specific gravity of the component material include, inter alia, barium sulfate, zinc oxide or other heavy metals such as lead, iron, aluminum, nickel, tungsten, copper and zinc. For example, the core component material of a cutting line can obtain a relatively high density by filling the polymer matrix forming the core with tungsten or barium sulfate at 50 wt/wt %. The core component material would then be surrounded with a tougher component material such as nylon 6/66 or similar polymer or copolymer, and, if desired, this tougher component material may be surrounded by another component material, perhaps, as mentioned above, a smoother component material, to minimize damage to the head of the rotary trimmers in which the cutting line would be used.

The advantage of the high density component material is that it provides greater mass in the same resulting diameter of conventional lines, thereby improving the performance of the cutting line in cutting the blades of grass or other vegetation. The increased performance is due to the fact that, the force of the resulting impact of the cutting line on the vegetation will increase linearly with the increase in density of the monofilament. This is based upon the well known principal that force equals mass times acceleration, F=ma. Consequently, a two-fold increase in density would result in a two-fold increase in the force impacted on the vegetation. This is believed to result in faster and more effective trimming or cutting of the vegetation.

A multi-component aspect could give better inherent quality to the cutting line inasmuch as it is generally known that the addition of some high density type materials could affect the impact or bend recovery properties of a singularly extruded monofilament. A cutting line produced with a core component material comprising a high density component material encapsulated by a tough polymer sheath may produce a suitably tough monofilament cutting line with increased density.

Thus, according to this embodiment of the present invention, a multi-component monofilament cutting line is provided having at least two component materials, wherein one component material is a component material having a high specific gravity. Where the base polymer used in nylon, it is known that nylon 6 and nylon 6/66 have a specific gravity of about 1.15 g/cc. Accordingly, any filler or component material having a specific gravity greater than 1.15 g/cc would be suitable for the present invention.

As mentioned, the increased density of one of the component materials results in an increase in the force impacted on the vegetation being cut by the cutting line, although the diameter of the cutting line of this embodiment may remain substantially identical to conventional cutting lines. Additionally, by employing a high density component material, it may be possible to dictate the orientation of the cutting line's leading edge as the cutting line is spun by a rotary trimmer to cut down vegetation.

Figure 6:
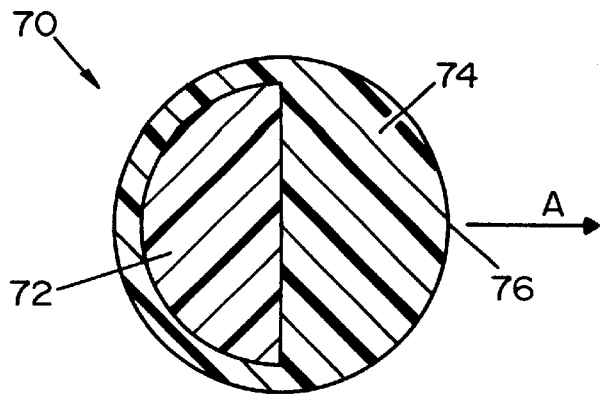
FIG. 6 is a representative cross-sectional view of a sixth embodiment of the multi-component monofilament cutting line of the present invention.

With reference to FIG. 6, it can be seen that a monofilament cutting line according to this embodiment of the present invention is designated generally by the numeral 70. Cutting line 70 includes first component material 72, which asymmetrically (with respect to its cross-section) defines a portion of the core of cutting line 70, and second component material 74, which surrounds first component material 72 and, thus, provides a sheath. First component material 72 has a specific gravity higher than the second component material, while the second component material 74 is preferably tough and wear resistant as disclosed above with respect to other embodiments.

Notably, first component materials 72 and second component material 74 are asymmetrical with each other, although the present invention should not be limited thereto or thereby. By positioning the high density first component material 72 to the rear of the center axis of the cutting line 70 with respect to the direction of movement of cutting line 70 as delineated by the arrow A, first component material 72 weighs cutting line 70 such that leading edge 76 provided by second component material 74 and containing the tough, impact resistant material will be the first portion of cutting line 70 to impact the vegetation being cut.

Figure 7:
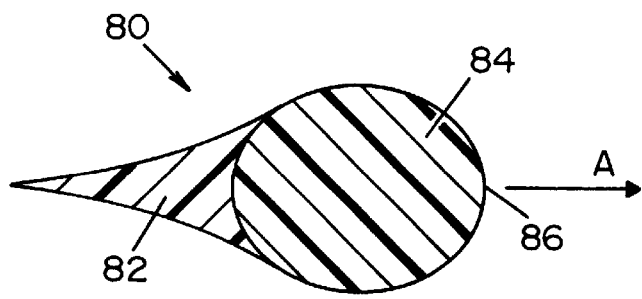
FIG. 7 is a representative cross-sectional view of a seventh embodiment of the multi-component monofilament cutting line of the present invention.

Similarly, in FIG. 7, a bi-valve construction of a cutting line, generally denoted by the numeral 80, is shown. Here, first component material 82 forms the tail of cutting line 80 while second component material 84 comprises the body of cutting line 80. First component material 82 is of high density, and second component material 84 is tough and wear resistant. Like FIG. 6, by positioning the high density first component material 84 behind the center axis of cutting line 80 with respect to the direction of movement of cutting line 80 as delineated by the arrow A, the material 82 will weight cutting line 80 so that leading edge 86 of the tough second component material will impact vegetation first. It is also envisioned that cutting lines, such as cutting lines 70 or 80, could be sheathed or color-coded for ease of insertion of the cutting line into the head of the rotary trimmer.

Conventional nylon monofilament cutting lines typically have a specific gravity of about 1.15 g/cc or less. However, in this embodiment of the present invention, the high density component material, whether filled or unfilled, preferably has an overall specific gravity greater than about 1.15 g/cc. Thus, the multi-component cutting line will also have a specific gravity of greater than 1.15 g/cc.

Having described the high density component material embodiment of the present invention, it should be readily apparent that this concept can be applied in any of the embodiments previously disclosed or disclosed hereinbelow. For example, the cutting lines of FIGS. 1–5 could contain a high density component material at their cores so as to increase the force of impact on vegetation being cut by the cutting line, while the diameter of the cutting line may remain substantially identical to conventional cutting lines. Likewise, in the embodiments disclosed hereinbelow, it should be readily apparent how a high density component material may advantageously impact the function of the cutting line.

Figure 8:
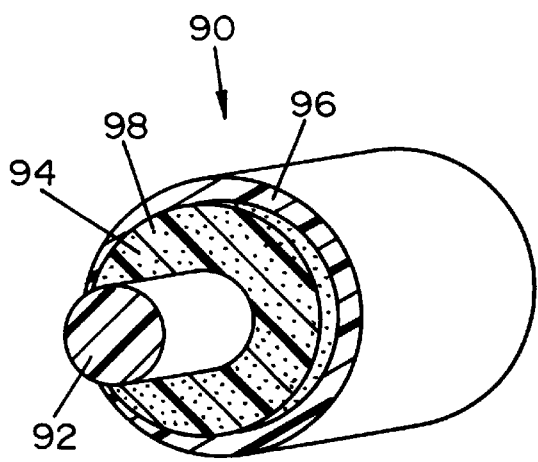
FIG. 8 is a representative segmented, perspective view of an eighth embodiment of the multi-component monofilament cutting line of the present invention having each layer of the multi-component cutting line partially striped away.

Fillers may also advantageously be employed for purposes other than increasing the density of a component material. Particularly, a component material may be filled with an abrasive material serving to provide the component material with a more aggressive cutting edge. Thus, in still another embodiment of the cutting line of the present invention, the concept of using a smooth, softer outer sheath surrounding a harder, more abrasive core or mantle material is maintained as described above. As shown in FIG. 8, a monofilament cutting line 90 includes first component material 92, second component material 94, and third component material 96, which can be considered as core, mantel, and sheath layers, respectively. The first component material 92 and third component material 96 may, respectively, include any of the materials or configurations disclosed herein with respect to various core and sheath layers of a cutting line. Second component material 94, however, contains abrasive material 98. It will be appreciated that abrasive material 98 could instead or in addition be employed in the core (i.e. first component material 92) of cutting line 90 without the need for a mantle layer (i.e. second component material 94), or in more than one mantle layer. Nevertheless, where used, abrasive material 98 is distributed throughout.

Abrasive material 98 can be essentially any abrasive known in the art and is preferably grit material. Grit material may include, inter alia, silica dioxide, sand, and titanium nitride. Generally, these materials are relatively large particles. The advantage of using abrasive materials 98 is that it provides a more aggressive cutting edge, thereby improving the performance of a cutting line in cutting vegetation.

During use, third component material 96 (i.e. the sheath) would be worn away while performing an initial cutting. This would expose second component material 94 containing abrasive materials 98. Thus, third component material 96 (sheath) can be either a polymer commonly used in the manufacture of cutting lines or a less hard and less tough polymer such as a low molecular weight polyamide or polyolefin, as described above. Where a softer, easily removed outer sheath is employed, it is generally preferred that the abrasive type material be distributed throughout the mantle (e.g. second component 94) and that the core include a tough, impact resistant polymer commonly used in the production of cutting line. Again, concerns regarding delamination of the core from the mantle or sheath can be addressed as described above. Additionally, the same techniques can be used to improve the adhesion of the grit material to the surrounding polymer matrix.

In addition, it is envisioned that the core material itself can be used as the abrasive material. It is well known that some of the polymers commonly used in the production of monofilament, when left slightly wet, will incur bubbles after being extruded through the die head. It is believed a roughened surface formed by the rupture of these bubbles could also be used as an embedded abrasive. Indeed, such bubbles and roughened surfaces are to be considered "abrasive material" for purposes of the present invention.

In order to demonstrate practice of the present invention, several studies have been conducted. Most pertinent of these is believed to be the test related to wear resistance. Here, a number of single component monofilament cutting lines and multi-component monofilament cutting lines having the same specific gravity and the same cross-sectional configuration were tested. One multi-component monofilament cutting line employed a first material of conventionally extruded nylon 6/66 sheathed by a second component material of specially processed and extruded nylon 6/66. This cutting line was compared to a conventionally extruded nylon 6/66 cutting line as well known in the art. In the test, cutting was done on a 1200 square foot grass field. The amount of cutting used was then determined. In this case, the multi-component cutting line cut about 3200 square feet of grass per inch of cutting line worn. This compared to only about 550 square feet of grass per inch of cutting line worn for the control.

In another instance, a multi-component monofilament cutting line employed a first material of conventionally extruded nylon 6 sheathed by a second component material of specially processed and extruded nylon 6. This cutting line was compared to a conventionally extruded nylon 6 cutting line. In this case, the multi-component cutting line cut about 980 square feet per inch of cutting line worn, while the conventional nylon 6 cutting line cut only 235 square feet per inch of cutting line worn. Clearly, there was a significant increase in the wear resistance of the multi-component cutting line.

Thus, it should be evident that the various embodiments of cutting lines of the present invention are highly effective in improving the grass cutting performance over known cutting lines. It should be appreciated that each of the embodiments disclosed hereinabove may be employed separately or may be employed in combination with other embodiments herein disclosed. Thus, shaped cutting lines including component materials providing cutting edges having better wear and abrasion resistant properties than other component materials within the cutting line may, optionally, include high density component materials and/or component materials including abrasive materials. Likewise, a cutting line including a high density component material may optionally include component material providing cutting edges having better wear and abrasion resistant properties than other components within the cutting line, may include recessed edges, may include a smooth protective sheath component material, and/or may include a component material including an abrasive material. Indeed, it should be readily apparent that each embodiment of the present invention may be employed separately or together with any number of other embodiment disclosed herein. The invention is particularly suited for use in rotary trimmers having a rotating head, but is not necessarily limited thereto. The cutting lines of the present invention can be used separately or with other equipment, methods and the like.

Based upon the foregoing disclosure, it should now be apparent that the use of the extruded multi-component monofilament as a vegetation cutting line as described herein will carry out the objects set forth hereinabove. It is, therefore, to be understood that any variations evident fall within the scope of the claimed invention and thus, the selection of specific component elements and cross sectional shapes of the monofilament can be determined without departing from the spirit of the invention herein disclosed and described. In particular, the crosssectional configurations of each monofilament, as well as the core, the mantle or the sheath thereof, according to the present invention are not necessarily limited to those shown in the drawings. Any shaped monofilament cutting line and capable of being extruded as a shaped multi-component monofilament can be employed. Moreover, as noted hereinabove, compositional ingredients other than those particularly specified in this description can be substituted for those identified, provided that they can be extruded. Thus, the scope of the invention shall include all modifications and variations that may fall within the scope of the attached claims.

What is claimed is:

1. An extruded monofilament cutting line for a rotary trimmer for cutting vegetation comprising:
    a first component material having an exterior surface;
    a second component material, the same or different in chemical structure from said first component material, and having an exterior surface;
    third component material, the same or different in chemical structure from said first component material or said second component material, wherein said second component material is positioned on the exterior surface of said first component material and said third component material is positioned on the exterior surface of said second component material; and
    wherein impact and wear resistance properties of said second component material are greater than impact and wear resistance properties of said first component material, and impact and wear resistance properties of said third component material are greater than impact and wear resistance properties of said second component material.

2. The extruded monofilament cutting line as in claim 1, wherein said second component material sheaths said first component material.

3. The extruded monofilament cutting line as in claim 1, wherein said third component material sheaths said second component material.

4. The extruded monofilament cutting line as in claim 1, wherein at least a portion of said third component material contacts a portion of said exterior surface of said first component material.

5. The extruded monofilament cutting line as in claim 1, wherein said first component material forms at least a portion of a core of the cutting line; said second component material forms at least a portion of an intermediate mantle layer of the cutting line; and said third component material forms a sheath of the cutting line.

6. The extruded monofilament cutting line as in claim 1, wherein said second component material does not entirely surround said first component material.

7. The extruded monofilament cutting line as in claim 1, wherein said third component material does not entirely surround said second component material.

8. The extruded monofilament cutting line as in claim 1, wherein wear resistance properties of said second component material are at least twice as great as the wear resistance properties of said first component material.

9. The extruded monofilament cutting line as in claim 1, wherein impact and wear resistance properties of said second component material are greater than impact and wear resistance properties of said third component material, said third component material having impact and wear properties good enough to protect a trimmer head from damage during operation, but able to wear upon impact with vegetation.

10. The extruded monofilament cutting line as in claim 1, further comprising an abrasive filler in one of at least said first component material, said second component material, and said third component material.

11. The extruded monofilament cutting line as in claim 1, wherein said third component material is separately extruded from said second component material, and said second component material is separately extruded from said first component material.

12. An extruded monofilament cutting line for a rotary trimmer for cutting vegetation comprising:
    a first component material having an exterior surface; and
    a second component material, the same or different in chemical structure from said first component material, wherein said second component material is extruded on the exterior surface of said first component material, but does not form a sheath around said first component material.

13. An extruded monofilament cutting line as in claim 12, wherein said first component material has an increased impact strength as compared to the impact strength of said second component material.

14. The extruded monofilament cutting line as in claim 12, wherein said second component material has wear and abrasion resistance properties greater than wear and abrasion resistance properties of said first component material.

15. The extruded monofilament cutting line as in claim 12, wherein said second component material has a wear resistance at least twice as great as the wear resistance of said first component material.

16. The extruded monofilament cutting line as in claim 12, wherein said first component material and said second component material are made from a same or different material polymer selected from the group consisting of polyolefins, polyimides, and polyurethanes, and copolymer, terpolymer and ionomer blends thereof.

17. The extruded monofilament cutting line as in claim 12, wherein said first component material has a specific gravity greater than the specific gravity of said second component material.

18. The extruded monofilament cutting line as in claim 12, wherein said second component material is separately extruded from said first component material.

19. An extruded monofilament cutting line for a rotary trimmer for cutting vegetation, comprising:
    a first component material made of nylon; and
    a second component material made of nylon produced from a different process technique, having a differently oriented chemical structure and having different physical properties with respect to wear resistance and abrasion resistance than said first component material.

20. The extruded monofilament cutting line as in claim 19, wherein said second component material has a specific gravity of about 1.15 g/cc and said first component material has a specific gravity greater than 1.15 g/cc.

21. The extruded monofilament cutting line as in claim 19, wherein said first component material has a specific gravity greater than the specific gravity of said second component material.

22. The extruded monofilament cutting line as in claim 19, wherein said first and second component materials are nylon 6/66.

23. The extruded monofilament cutting line as in claim 19, wherein said first component material and said second component material are asymmetrically positioned in cross section with respect to each other.

24. The extruded monofilament cutting line as in claim 19, wherein said second component material forms a sheath around said first component material.

25. The extruded monofilament cutting line as in claim 19, wherein said first component material is positioned substantially behind said second component material, thereby dictating a leading edge of the cutting line as being that formed by said second component material.

26. An extruded monofilament cutting line for a rotary trimmer for cutting vegetation comprising:

a first component material having a specific gravity of about 1.15 g/cc or less; and a second component material having a specific gravity greater than 1.15 g/cc, wherein said second component material forms at least a portion of a core of the cutting line, and wherein said first component material forms a sheath around said second component material.

27. The extruded monofilament cutting line as in claim 26, wherein said first component material and said second component material are asymmetrically positioned in cross section with respect to each other.

28. The extruded monofilament cutting line as in claim 26, further comprising a third component material surrounding said second component material.

* * * * *